United States Patent [19]

Dakss et al.

[11] 4,239,333
[45] Dec. 16, 1980

[54] NON-TWIST ECCENTRIC COUPLER

[75] Inventors: Mark L. Dakss, Sudbury; George J. Meslener, Acton; Samuel M. Stone, Lynnfield, all of Mass.

[73] Assignee: GTE Laboratories Incorporated, Waltham, Mass.

[21] Appl. No.: 966,170

[22] Filed: Dec. 4, 1978

[51] Int. Cl.³ ............................................. G02B 5/14
[52] U.S. Cl. ................................ 350/96.21; 350/320
[58] Field of Search ............... 350/96.15, 96.20, 96.21, 350/96.22, 320

[56] References Cited

U.S. PATENT DOCUMENTS

| | | | |
|---|---|---|---|
| 3,800,388 | 4/1974 | Börner et al. | 29/200 P |
| 3,871,744 | 3/1975 | Bridger et al. | 350/96.21 |
| 3,902,784 | 9/1975 | Dakss et al. | 350/81 |
| 3,914,880 | 10/1975 | Dakss et al. | 350/96.21 |
| 3,936,142 | 2/1976 | Kersten | 350/96.15 |
| 3,936,143 | 2/1976 | Sato | 350/96.21 |
| 3,938,895 | 2/1976 | Bridger et al. | 356/152 |
| 3,999,841 | 12/1976 | Dakss et al. | 350/320 |
| 4,019,806 | 4/1977 | Fellows et al. | 350/96.21 |
| 4,030,809 | 6/1977 | Onishi et al. | 350/96.21 |
| 4,146,300 | 3/1979 | Kaiser | 350/96.21 |

FOREIGN PATENT DOCUMENTS

| | | | |
|---|---|---|---|
| 2358785 | 6/1975 | Fed. Rep. of Germany | 350/96.20 |
| 2554958 | 6/1977 | Fed. Rep. of Germany | 350/96.21 |
| 2626243 | 12/1977 | Fed. Rep. of Germany | 350/96.21 |
| 2643771 | 3/1978 | Fed. Rep. of Germany | 350/96.21 |
| 2645701 | 4/1978 | Fed. Rep. of Germany | 350/96.21 |

OTHER PUBLICATIONS

Guttmann et al., "A Simple Connector For Glass Fibre Optical Waveguides", *A.E.U.*, vol. 29, No. 1, Jan. 1975, pp. 50-52.
Zemon et al., "Eccentric Coupler For Optical Fibers: A Simplified Version", *Applied Optics*, vol. 14, No. 4, Apr. 1975, pp. 815-816.
Guttmann et al., "Optical Fiber-Stripline-Coupler", *Applied Optics*, vol. 14, No. 5, May 1975, pp. 1225-1227.
Vucins, "Adjustable Single-Fiber Connector With Monitor Output", *3rd Eur. Conf. on Opt. Commun.*, Munich, Sep. 1977, pp. 100-102.

*Primary Examiner*—John K. Corbin
*Assistant Examiner*—John D. Lee
*Attorney, Agent, or Firm*—Fred Fisher

[57] ABSTRACT

One optical fiber is coupled to another by apparatus which includes a connector plug for each fiber, with the fibers supported within their respective plug. The plugs each have a main cylindrical surface, and a shoulder with a non-cylindrical configuration. Two sleeves are provided, each having a longitudinal eccentric hole therethrough large enough so that the main cylindrical surface of the respective plug can rotatably fit therethrough.

A first means supports one sleeve for rotational movement about a first axis, while a second means supports the other sleeve for rotational movement about a second axis. The two axes are parallel to, but not colinear with, each other. Two female means are provided, associated with their respective support means, for receiving the respective shoulders and for preventing significant rotation of their respective connector plug. The two support means can include a common V-block, and a shim located on one-half of one side of the V-block. The non-cylindrical configuration of the shoulders can include a shape having a pair of flat, parallel surfaces separated by a fixed distance, and the female means can include respective slotted means, associated with respective support means, for receiving the flat surfaces of the respective plugs. Alternatively, the two sleeves can have different diameters, so that a single V-block can be used without a shim.

8 Claims, 12 Drawing Figures

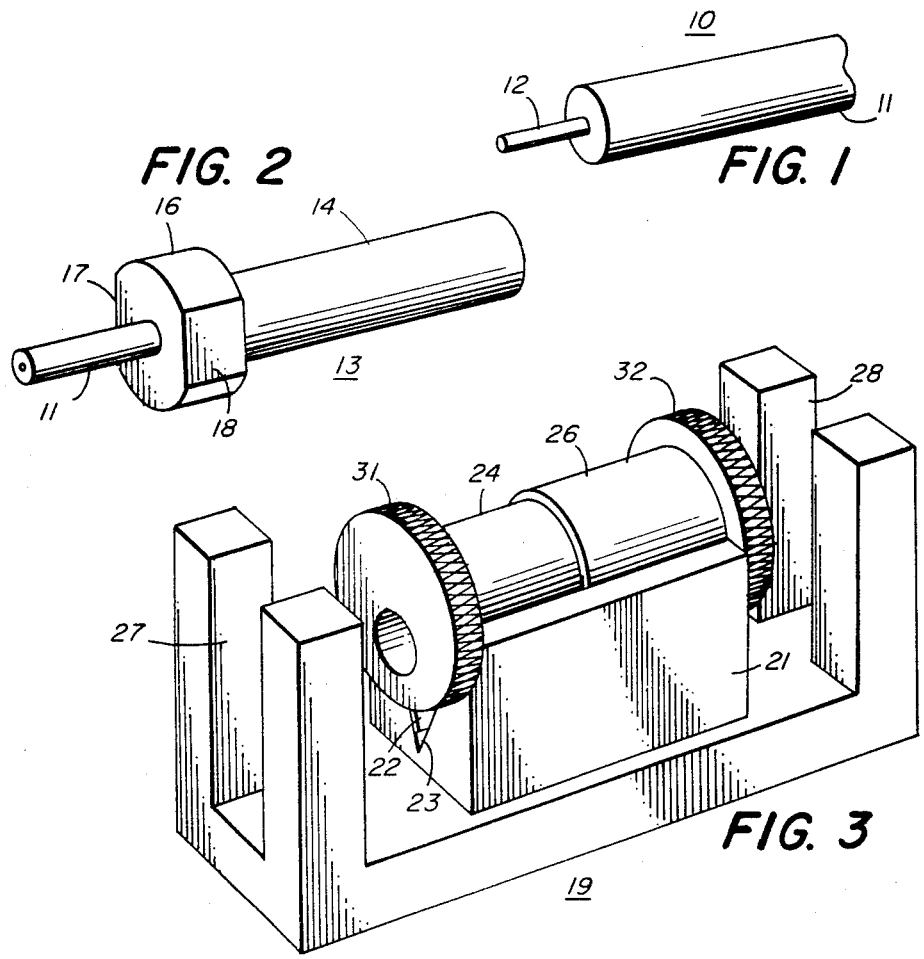
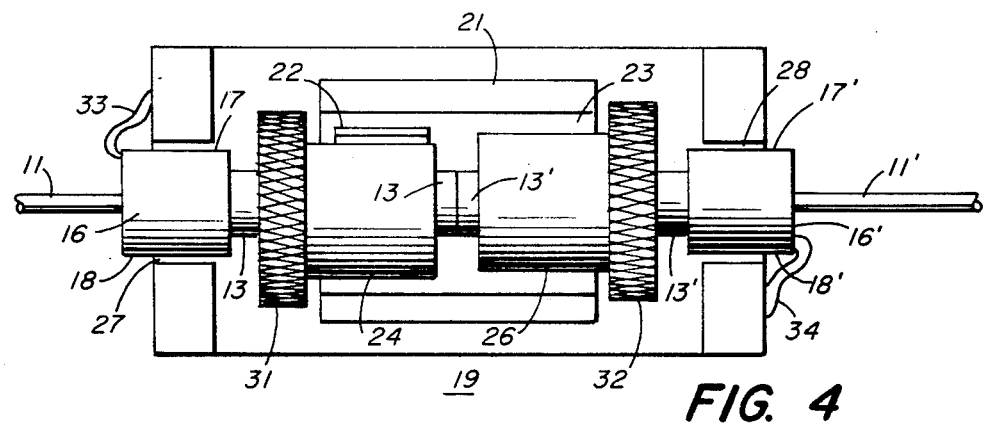

NON-TWIST ECCENTRIC COUPLER

BACKGROUND OF THE INVENTION

1. Field of the Invention

This invention relates to methods of and apparatus for coupling one fiber to another fiber, and, in particular, to such fibers as are used in fiber-optical communications systems. Accordingly, it is a general object of this invention to provide new and improved methods and apparatus of such character.

2. Description of the Prior Art

Optical fibers are useful in communication systems. They are also suitable in systems analogous to electric systems, such as control systems, burglar alarms, and the like. A coupler, useful for connecting optical fibers together, would be useful in fields analogous to that of electric wire connectors or couplers.

To implement practical fiber-optical communication systems, it is desirable to have fiber-to-fiber couplers which can be easily uncoupled and recoupled for the following system elements:

(a) Terminal connections—to connect the system fibers to a light source, detector, or repeater modules. Most modules would contain a short length of fiber terminated by a connector (which would form part of the module) which, in turn, would be coupled to the connector terminating the system fiber.

(b) Interchangeable fiber-to-fiber routing interconnections.

A fiber-to-fiber coupling method appropriate for the foregoing, and having properties of convenient operation, ruggedness and high coupling efficiency is an eccentric coupler discussed by S. Zemon, D. Fellows, and P. Sturk, "Eccentric Coupler for Optical Fibers: A Simplified Version," *Appl. Opt.* 14, 815 (1975). Such coupler is useful for coupling single-mode fibers (as well as multimode fibers) together and to components such as integrated optical circuits. However, the tuning operation of such coupler to achieve maximum throughput involves twisting of the fibers being coupled (Case b above), or the twisting of one fiber and of the terminal module (Case a above). This twisting can be through 180° or more. Although this twisting is not a problem with long lengths of bare fiber in the laboratory, it becomes a problem when the fiber has protective jacketing (which increases the stiffness), especially if short lengths are involved as at a cable terminating point. Fibers are thereby subjected to stresses which can easily fracture the fiber, and it is hard to protect the fiber against this type of breakage. In addition, it may often be the case that the terminal module involves bulky electronics (such as cards) which would interfere with the twisting of the module. This particularly would be a problem in a closely-spaced multiple array of couplers.

One approach to solving the above problems is the technique of J. Guttman, O. Krumpholz, and E. Pfeiffer, disclosed in "Optical Fiber-Stripline Coupler," *Appl. Opt.* 14, 1225 (1975), in which one element to be coupled need not have any motion but the other (usually the fiber, in a fiber-module coupling situation) must be twisted in a double-eccentric arrangement. This approach, then, only solves half of the problem.

3. Prior Art Statement

As a means of complying with the duty of disclosure set forth at 37 CFR 1.56, applicants incorporate the following prior art statement in their specification. The statement shall serve as a representation that the prior art listed therein includes, in the opinion of the applicants and their attorney, the closest prior art (other than that appearing elsewhere in the specification) of which they are aware. This statement shall not be construed as a representation that a search has been made or that no better art exists.

The following United States patents may be of interest, copies of which accompany this application:

U.S. Pat. No. 3,800,388 to Borner et al. relates to apparatus for aligning two optical components along a common optical axis, utilizing two holders, each holding a respective one of the optical components at a fixed distance from the axis of rotation of the respective holder. The holders are rotated with respect to each other until the optical components become optically aligned. The optical components are firmly secured in place once they are aligned by temporarily heating the housing, soldering, welding, clamping, or gluing. Generally, the components are held in their respective holders, where practicable, by force fit; with very small diameter, for example about 100$\mu$, it is difficut to form a bore with a corresponding inner diameter in the guide pin for holding this component, hence, a larger diameter bore can be used in association with adhesive. Disadvantageously, rotating the holders would tend to rotate the optical components, causing twisting.

U.S. Pat. No. 3,871,744 to Bridger et al. discusses fiber to fiber coupling by eccentric mounting in plugs in the background portion in column 1, ines 26–38. Since the fibers are held in place by the plugs, rotation of the plugs would cause the fibers to twist.

U.S. Pat. No. 3,902,784 to Dakss et al. relates to apparatus for forming an optical fiber connector. The optical fiber connector main body fixture includes means for positioning an optical fiber connector main body therein in a predetermined manner relative to the axis and thereafter holding the optical fiber connector main body in that position. In the case where the optical fiber connector main body is of a right cylindrical form, the preferred arrangement is a V-shaped mounting groove having planar vertically oriented side surfaces. A retainer such as a nylon tipped screw may be used to hold an optical fiber connector main body against the surfaces. A similar means is associated with the optical fiber fixture.

U.S. Pat. No. 3,914,880 to Dakss et al. relates to an optical fiber coupler and connector which illustrates a V-shaped holder arrangement.

U.S. Pat. No. 3,936,142 to Kersten discusses, in the background portion, that fibers can be held eccentrically in pins which are in turn eccentrically guided in bushings. By rotating the pins in relation to one another, optimum coupling of the fiber ends can be manually effected.

U.S. Pat. No. 3,936,143 to Sato discloses eccentric relationship with a means to turn only one fiber for adjustment.

U.S. Pat. No. 3,938,895 to Bridger et al. relates to a method of positioning an optical fiber which utilizes a V-shaped holder.

U.S. Pat. No. 3,999,841 to Dakss et al, which relates to a method for forming an optical fiber connector, also discloses a means for positioning an optical fiber with a V-shaped holder.

U.S. Pat. No. 4,019,806 to Fellows et al. discloses a holder for eccentrically mounted fibers. Rotation of an optical connector would cause twisting of the optical fiber, which may cause distortion and other undesirable effects.

U.S. Pat. No. 4,030,809 to Onishi et al. relates to an optical connector which is included of interest for eccentric cam mounting.

Broadly, the prior art teaches either concentric coupling (unrelated to the teachings of this invention) or eccentric coupling where optical fibers are frictionally held, causing twisting of the fiber upon rotation of the connector.

Another publication of the prior art, of interest, is an article, "Optical Fiber-Stripline-Coupler," J. Guttmann et al., *Appl. Opt.*, May 1975, Vol. 14, No. 5, pp. 1225-7. Its relevance was discussed above (see section 2).

SUMMARY OF THE INVENTION

Another object of this invention is to provide for new and improved methods of and apparatus for coupling one optical fiber to another without any appreciable twisting thereof.

In accordance with one embodiment of the invention, a method for coupling one optical fiber to a second optical fiber includes housing the fibers, individually, within respective connector plugs so that they are supported therewithin, and so that the fibers are in approximate contact with each other. The two plugs are revolved about respective axes parallel to, but not colinear with, their central axes, without rotation of said plugs about their respective central axes. The revolution of the two plugs generate fiber axis orbits which intersect at two points; the revolution of the plugs is caused to cease when the fibers are aligned at one of the two points.

In accordance with another embodiment of this invention, apparatus for coupling one optical fiber to another includes a connector plug for each fiber, with the fibers supported within their respective plug. The plugs each have a main cylindrical surface, and a shoulder with a non-cylindrical configuration. Two sleeves are provided, each having a longitudinal eccentric hole therethrogh large enough so that the main cylindrical surface of the respective plug can fit therethrough.

A first means supports one sleeve for rotational movement about a first axis, while a second means supports the other sleeve for rotational movement about a second axis. The two axes are parallel to, but not colinear with, each other. Two female means are provided, associated with their respective support means, for receiving the respective shoulders and for preventing significant rotation of their respective connector plug. In accordance with one feature of the invention, the two support means include a common V-block, and a shim located on one-half of one side of the V-block. In accordance with another feature of the invention, a base is provided, and the two female means are adapted for sliding engagement with respect to the base, thereby inhibiting any rotation of the respective connector plugs. In accordance with another aspect of the invention, the non-cylindrical configuration of the shoulders can include a shape having a pair of flat, parallel surfaces separated by a fixed distance, and the female means can include respective slotted means, associated with respective support means, for receiving the flat surfaces of the respective plugs. In a different embodiment, the two sleeves can have different diameters, so that a single V-block can be used without a shim.

BRIEF DESCRIPTION OF THE DRAWINGS

Other objects, advantages, and features of this invention will become more apparent from the following description, when read in conjunction with the accompanying drawings, in which FIG. 1 is a perspective view of a jacketed optical fiber for use with this invention;

FIG. 2 is a perspective view of a connector plug for use in a preferred embodiment of this invention;

FIG. 3 is a perspective view of the coupling assembly, less connectors and cable, for use in the preferred embodiment of this invention;

FIG. 4 is a top view of the coupling assembly, when aligned, of the preferred embodiment of this invention;

DESCRIPTION OF A PREFERRED EMBODIMENT

Figure 5:
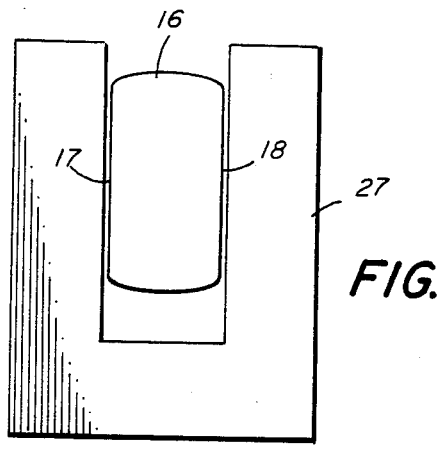
FIG. 5 is an end view of the assembly of FIG. 4 showing the connector shoulder in the slot, with the connector hole and associated fiber not shown.

Referring to FIG. 1, there is shown a perspective view of a jacketed optical fiber 10 including an outer jacket 11 and an inner optical fiber 12.

Preferably, the fiber 12 is mounted in a connector plug 13 (FIG. 2) having a main outer cylindrical surface 14, such that the fiber 12 is approximately (within ½ to 1 mil) centered with respect to such surface 14. The centering can be performed without elaborate centering procedures by using known techniques such as, for example, the jig described by S. Zemon, D. Fellows, and P. Sturk, "Eccentric Coupler for Optical Fibers: A Simplified Version." *Appl. Opt.*, May 1975, Vol. 14, No. 5, pp 815 et seq.

A shoulder 16 of the plug 13 has two flat, parallel surfaces 17, 18.

An eccentric body coupler 19, as illustrated in FIG. 3, includes a V-block 21, having a shim 22 on one-half of one side 23 of the V.

The connector plugs 13 and 13', to be mated, are not put directly onto the V-block 21, but rather into metal sleeves 24, 26, respectively (see FIGS. 3 and 4). Each of the sleeves 24, 26 has an eccentric hole large enough so that the connector plug 13 can fit within. To avoid scoring and work-hardening conditions, the V-block 21, the plugs 13, 13' and sleeves 24, 26 should all be made of steel. The diameter clearance of the connector plugs 13, 13' in the sleeves 24, 26 should be as small as possible, and still permit rotation without binding. Both sleeves 24, 26 have the same main body diameter and the same hole eccentricity.

Slotted parts 27, 28 associated with the V-block 21 bear loosely against the flat surfaces 17, 18 and 17', 18' of the connector plugs 13, 13' respectively, and keep the connector plugs 13, 13' from rotating appreciably as will become more apparent hereinafter. The sleeves 24, 26 also have a knurled shoulder 31, 32 for manual rotation. Since the outer-diameters of the main bodies of the two sleeves 24, 26 are the same, the axes of rotation of the sleeves 24, 26 are offset from one another because of the presence of the shim 22.

Operation of the coupler 19 in this embodiment occurs as follows:

(a) The connector plugs 13, 13' are inserted into their respective sleeves 24, 26.

(b) The connector-sleeve combinations 13, 24 and 13', 26 are lowered into the V-block 21 so that the flat surfaces 17, 18 and 17', 18' of the connector shoulders 16, 16' fit within the slots 27, 28, respectively.

(c) The connector plugs 13, 13' are pushed together until their ends (and therefore the fiber ends 12, 12') touch. If desired, index-matching oil may be applied first through the space between the sleeves to increase the coupling efficiency by approximately 8%.

(d) The sleeves 24, 26 are then rotated via their knurled shoulders 31, 32. The fiber axes thereby trace out circles having radii equal to the eccentricity of the holes in the sleeves 24, 26. The circles have centers separated by an offset amount produced by the shim 22. This effectively produces the same type of tuning as in standard eccentric couplers, and in the same convenient time period. Typical values are radii of 0.006 in., offset of 0.004 in. and tuning of the fiber in a minute or two. Note that the width of the slots 27, 28 must be larger than the distance between the flat surfaces 17, 18 by an amount of twice the radii so that the connector plugs 13, 13' can move freely from side to side as the sleeves 24, 26 are rotated. However, the total rotation angle of the connector plugs is limited to the small value given by $r/(l/2)$, where r is equal to the eccentricity of the holes in the sleeves 24, 26, l is the diameter of the connector shoulder (FIG. 5), or by 4° for l=0.180 in., r=0.006 in.

(e) If desired for a firm connection, plastic (e.g., nylon) screws can be applied laterally against the sleeves. Spring clips 33, 34 (see FIG. 4) can also be applied against the ends of the connector plugs 13, 13' to keep them together while the sleeves 24, 26 are being rotated and afterwards. Note that if one item to be connected is a terminal module which can be rotated freely, one sleeve 24 can be eliminated completely and the end of the module formed to have the diameter of the sleeve. (The fiber within would have the same eccentricity as above).

Various modifications can be performed in the foregoing embodiment without departing from the spirit and scope of this invention. For example, the fiber 12 can be scored and broken and inserted into a small V-groove in the plug as in the Guttman et al. article, supra.

DESCRIPTION OF A SECOND EMBODIMENT

Figure 6:
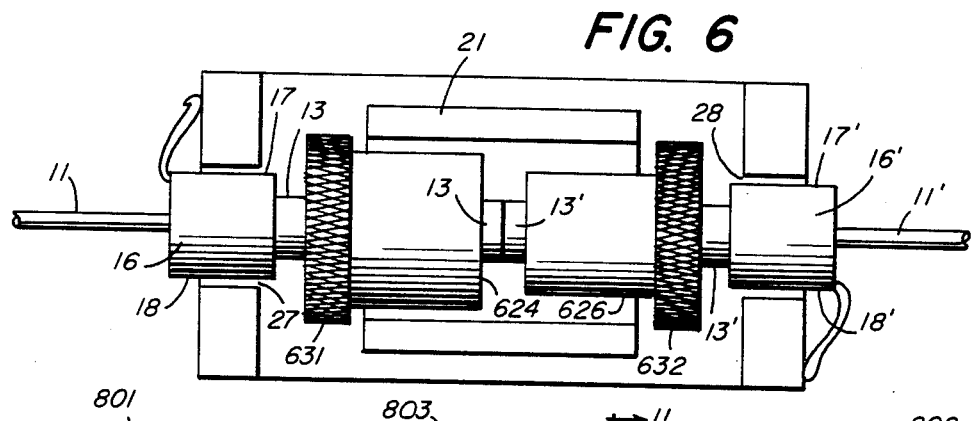
FIG. 6 is a top view of a second embodiment of this invention showing the coupling assembly without a shim.
Figure 9:
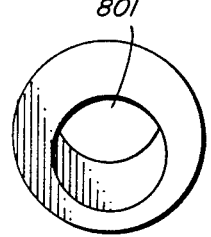
FIGS. 8, 9, 10, and 11 are perspective, left end, right end, and sectional view along the lines 11—11 of FIG. 8, respectively, of another embodiment of this invention, utilizing two offset holes in the cylinder in lieu of a single hole, as in the embodiment of FIG. 7.
Figure 8:
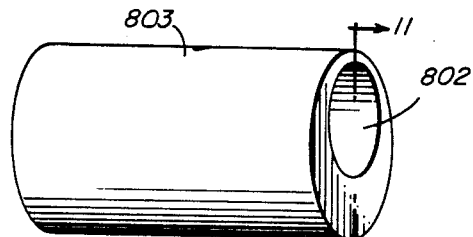
Figure 10:
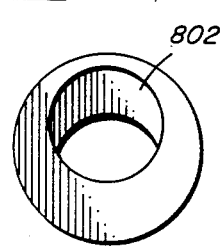
Figure 11:
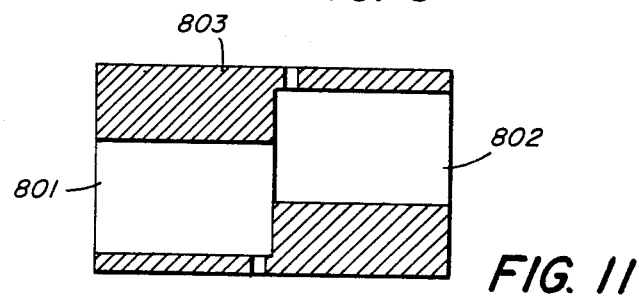

Referring to FIG. 6, there is illustrated an embodiment similar to that depicted in FIG. 4, but in which the shim 22 is eliminated. This is achieved by utilizing two sleeves 624, 626 (in lieu of the sleeves 24, 26) which have different outer diameters A1 and A2, but the same hole eccentricity r. Thus, the axes of rotation of the two sleeves 624, 626, and the two fibers 12, 12' are separated by half the difference between A1 and A2, thus entirely eliminating the shim.

DESCRIPTION OF OTHER EMBODIMENTS

Figure 7:
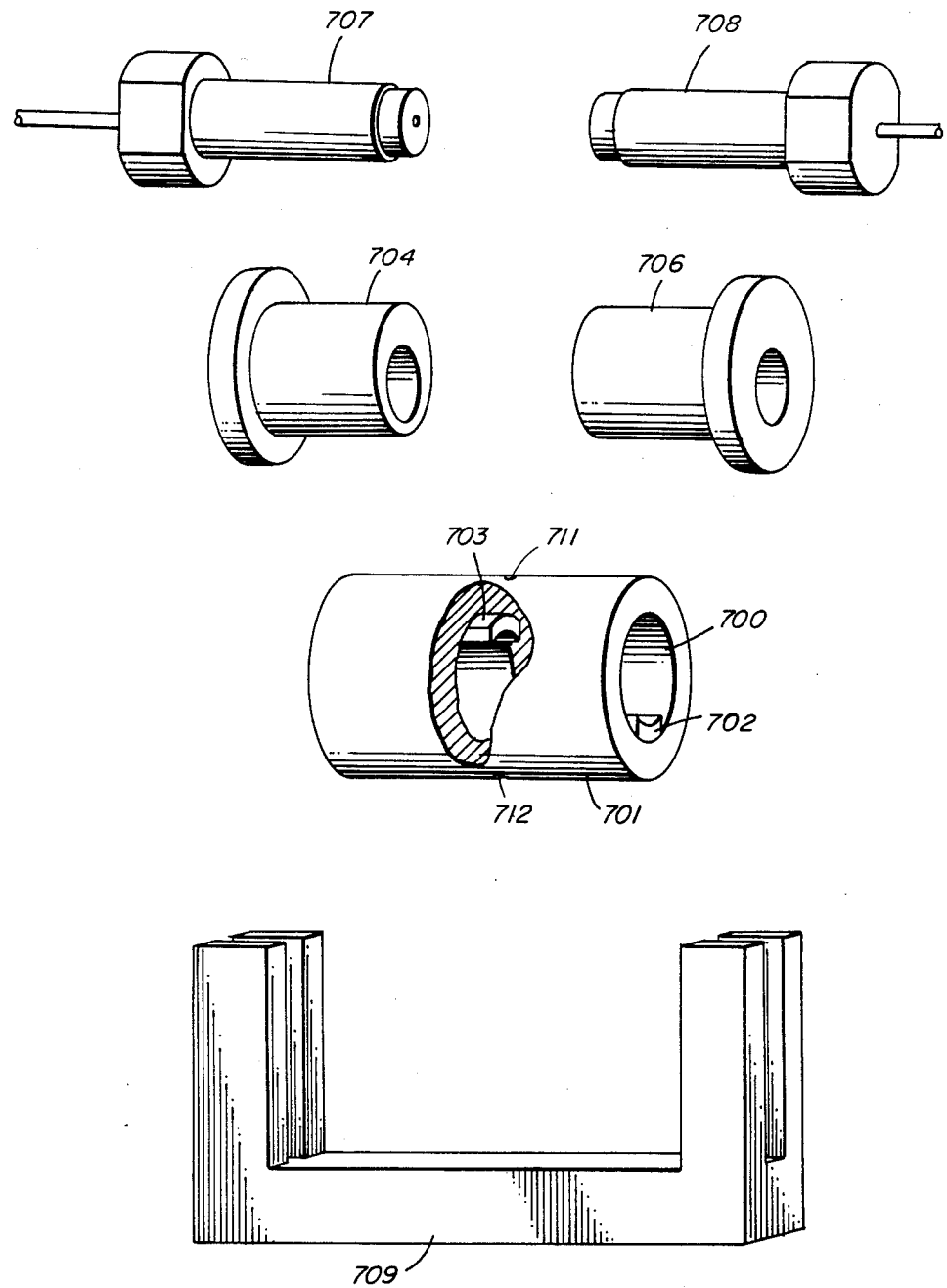
FIG. 7 is an exploded view of another embodiment of this invention showing a coupling assembly using circular hole geometry.

A third embodiment which eliminates the V-block is to use a strictly circular-hole geometry (FIG. 7). Here, a single hole 700 through a steel cylinder 701 and containing two shims 702, 703 oppositely placed replaces the V-block 21 of FIGS. 3 and 4. Two sleeves 704, 706 having the same main outer diameter are inserted in opposite ends of the hole 700. The connector plugs 707, 708, as before, fit within them. The slotted structure need not be attached to the cylinder 701. If it is not attached, any two of the three parts 701, 704, 706 can be rotated to produce the appropriate fiber alignment. The non-rotated part can simply be held still by hand while each of the other two is alternately rotated. Or, one part (say, sleeve 706 and the connector plug 708 within) may be held rigidly, as sometimes may become necessary with terminal equipment. Then, if the cylinder 701 and sleeve 704 are rotated, the coupler can still be tuned to perfect alignment. Here, the axis of the sleeve 704 rotates in a circle C' of radius d about the axis of the sleeve 706, and subsequent rotation of the sleeve 704 with respect to the cylinder 701 produces circles of radius r centered along C'. As long as 2r is greater than d, alignment is achievable. Holes 711, 712 can be put into the cylinder 701 to permit application of index-matching oil. Another more complicated embodiment (FIGS. 8-11) involves putting two offset holes 801, 802 in cylinder 803 instead of the single hole 700 of FIG. 7. The body 803 can, in addition, have flat outer surfaces if it is desired to attach it to the slot assembly 709 of FIG. 7.

Other possible ways that the connector plugs can be mounted in the sleeve include V-grooves or ridges. Lateral pressure is applied (e.g., by a nylon screw threaded within the sleeve) to keep the connector plug pressed against the V-grooves or ridges.

Figure 12:
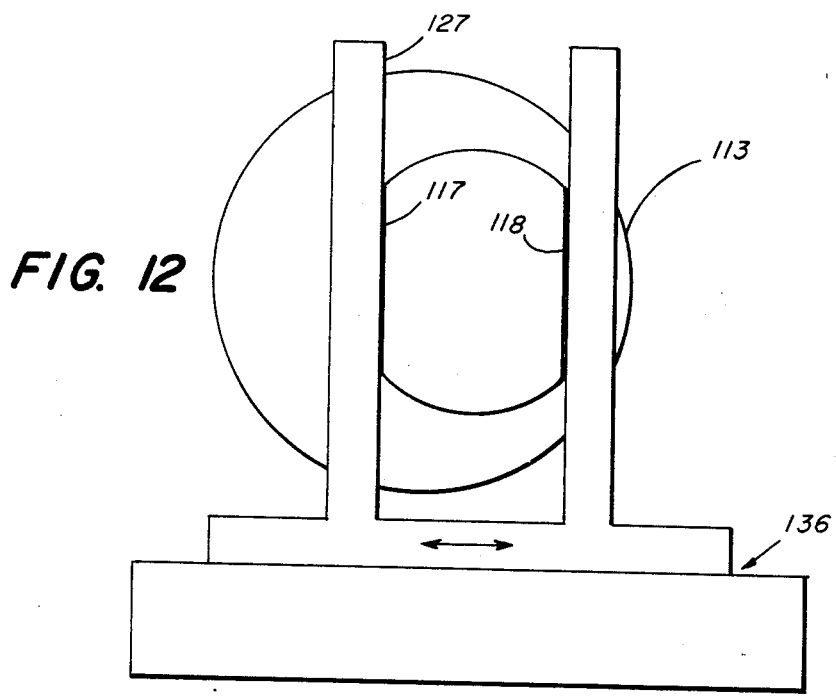
FIG. 12 is an end view of another embodiment of the invention.

Referring to FIG. 12, if it is desired to totally eliminate the small amount of twist that one or both connector plugs undergo in the above embodiments, the slots 127 can be made to fit more tightly on the flat connector plug surfaces 117–118. The slots 127 can then slide by an amount 2r along a track 136.

It is noted that multiple arrays of the above couplers can be made to handle arrays of fibers (the dimensions of the connector plugs and sleeves can be small).

Some advantages of the disclosed fiber-to-fiber (or fiber-to-terminal) coupling method over the prior art are that convenient, rugged and efficient "eccentric" coupling is possible, with the additional features that:

(a) Neither object being coupled needs to twist appreciably, i.e., by more than a few degrees. In one embodiment, no twist at all is required.

(b) The fiber cores need not have circular cross-section, as is often the case. As long as each fiber is mounted so that the core's long axis bears a consistent relation (e.g., is parallel or perpendicular) to the flat connector surfaces, the two fibers line up and do not now go out of line because of twisting. A non-circular core shape interferes considersbly in optimizing coupling efficiency in the prior art coupler.

(c) One object being coupled can be completely rigid if desired.

(d) No major increase in complexity of design over the prior art eccentric coupler is involved. At the same time, elimination of some parts of the prior art eccentric coupler is achieved.

(e) Cylindrical as well as V-groove geometries can be used.

Other modifications will appear obvious to those skilled in the art. Hence, it is desired that this invention be construed broadly, and limited solely to the scope of the issued claims and equivalents thereof.

We claim:

1. In combination, apparatus for coupling one optical fiber to another, comprising
   (a) a first connector plug for housing said one optical fiber, said first plug having a main cylindrical surface such that said one fiber is interiorly oriented with respect to said surface, said plug having a shoulder associated therewith, said shoulder having a pair of flat, parallel surfaces separated by a fixed distance;
   (b) a second connector plug for housing said another optical fiber, said second plug having a main cylindrical surface such that said another fiber is interiorly oriented with respect to said surface, said second plug having a shoulder associated therewith, said second shoulder having a pair of flat, parallel surfaces separated by said fixed distance;
   (c) a first sleeve having a longitudinal eccentric hole therethrough just large enough so that said main cylindrical surface of said first plug can rotatably fit therewithin;
   (d) a second sleeve having a longitudinal eccentric hole therethrough just large enough so that said main cylindrical surface of said second plug can rotatably fit therewithin;
   (e) first means for supporting said first sleeve for rotational movement about a first axis;
   (f) second means for supporting said second sleeve for rotational movement about a second axis; said second axis being parallel to, but not co-linear with said first axis;
   (g) first slotted means, associated with said first support means, for receiving said flat surfaces of said first plug; and
   (h) second slotted means, associated with said second support means, for receiving said flat surfaces of said second plug.

2. The apparatus as recited in claim 1 wherein said first support means and said second support means comprises:
   a common V-block, and
   a shim located on one-half of one side of said V-block.

3. The apparatus as recited in claim 1 wherein the elements (e) and (f) are coupled to each other; and the elements (g) and (h) are coupled to each other.

4. The apparatus as recited in claim 1 further comprising (i) a base; and wherein said slotted means (g) and (h) are adapted for sliding engagement with respect to said base.

5. In combination, apparatus for coupling one optical fiber to another, comprising
   (a) a first connector plug for housing said one optical fiber, said first plug having a main cylindrical surface such that said one fiber is interiorly oriented with respect to said surface, said plug having a shoulder associated therewith, said shoulder having a non-cylindrical configuration;
   (b) a second connector plug for housing said another optical fiber, said second plug having a main cylindrical surface such that said another fiber is interiorly oriented with respect to said surface, said second plug having a shoulder associated therewith, said second shoulder having a non-cylindrical configuration;
   (c) a first sleeve having a longitudinal eccentric hole therethrough just large enough so that said main cylindrical surface of said first plug can rotatably fit therewithin;
   (d) a second sleeve having a longitudinal eccentric hole therethrough just large enough so that said main cylindrical surface of said second plug can rotatably fit therewithin;
   (e) first means for supporting said first sleeve for rotational movement about a first axis;
   (f) second means for supporting said second sleeve for rotational movement about a second axis, said second axis being parallel to, but not co-linear with, said first axis;
   (g) first female means, associated with said first support means, for receiving said first shoulder and for preventing significant rotation of said first connector plug; and
   (h) second female means, associated with said second support means, for receiving said second shoulder and for preventing significant rotation of said second connector plug.

6. The apparatus as recited in claim 5 wherein said first support means and said second support means comprises
   a common V-block, and
   a shim located on one-half of one side of said V-block.

7. A method for coupling one optical fiber to a second optical fiber comprising
   (a) housing said one fiber interiorly oriented within a first connector plug;
   (b) housing said second fiber interiorly oriented within a second connector plug;
   (c) substantially abutting said plugs so that said fibers are in approximate contact with each other;
   (d) revolving said first connector plug about a first axis parallel to the central axis of said first connector plug without rotation of said first plug about said central axis;
   (e) revolving said second connector plug about a second axis parallel to the central axis of said second connector plug without rotation of said second plug about the central axis thereof; wherein
   the revolution of said first plug traverses a first orbit,
   the revolution of said second plug traverses a second orbit, and said two orbits intersect at two points; and
   (f) ceasing the revolution of said plugs when said fibers are aligned at one of said two points.

8. In combination, apparatus for coupling one optical fiber to another, comprising
   (a) a first connector plug for housing said one optical fiber, said first plug having a main cylindrical surface such that said one fiber is interiorly oriented with respect to said surface, said plug having a shoulder associated therewith, said shoulder having a non-cylindrical configuration;
   (b) a second connector plug for housing said another optical fiber, said second plug having a main cylindrical surface such that said another fiber is interiorly oriented with respect to said surface, said second plug having a shoulder associated therewith, said second shoulder having a non-cylindrical configuration;
   (c) a first sleeve having a longitudinal eccentric hole therethrough large enough so that said main cylindrical surface of said first plug can fit therewithin with minimal friction;
   (d) a second sleeve having a longitudinal eccentric hole therethrough large enough so that said main cylindrical surface of said second plug can fit therewithin with minimal friction;

(e) means (i) for supporting said first sleeve for rotational movement about a first axis, and (ii) for supporting said second sleeve for rotational movement about a second axis, said second axis being parallel to, but not colinear with, said first axis;
(f) first female means, associated with said first support means, for receiving said first shoulder and for preventing significant rotation of said first connector plug; and
(g) second female means, associated with said second support means, for receiving said second shoulder and for preventing significant rotation of said second connector plug.

* * * * *